(12) United States Patent
Suzuki (10) Patent No.: US 6,345,521 B1
(45) Date of Patent: Feb. 12, 2002

(54) SHIFT LOCK MECHANISM FOR SHIFT LEVER

(75) Inventor: Takayoshi Suzuki, Battle Creek, MI (US)

(73) Assignee: Fuji Kiko Co., Ltd., Kosai (JP)

( * ) Notice: Subject to any disclaimer, the term of this patent is extended or adjusted under 35 U.S.C. 154(b) by 0 days.

(21) Appl. No.: 09/573,338

(22) Filed: May 18, 2000

(30) Foreign Application Priority Data

May 31, 1999 (JP) .......................................... 11-151014

(51) Int. Cl.[7] .......................... B60R 25/06; E05B 65/12
(52) U.S. Cl. .......................................... 70/247; 74/475
(58) Field of Search .......................... 70/247, 248, 252; 74/475

(56) References Cited

U.S. PATENT DOCUMENTS

| | | | | |
|---|---|---|---|---|
| 4,326,432 A | * | 4/1982 | Miller | 74/475 |
| 4,671,085 A | * | 6/1987 | Yamaguchi et al. | 70/248 |
| 4,967,883 A | * | 11/1990 | Kito et al. | 192/4 A |
| 5,036,962 A | * | 8/1991 | Amagasa | 192/4 A |
| 5,167,308 A | * | 12/1992 | Osborn | 192/4 A |
| 5,428,977 A | * | 7/1995 | Knape | 70/247 |
| 5,682,777 A | * | 11/1997 | Specht | 70/247 |
| 5,913,909 A | * | 6/1999 | Schwab | 70/247 |

* cited by examiner

Primary Examiner—Lynne H. Browne
Assistant Examiner—John B. Walsh
(74) Attorney, Agent, or Firm—Foley & Lardner (57) ABSTRACT

A shift lock mechanism includes a shift lock lever having an inner cylindrical portion rotatably supported in a casing, and formed with an inner axial slot and a circumferential groove extending continuously from the axial slot, and a key lock lever having an outer hollow cylindrical portion mounted on the inner cylindrical portion of the shift lock lever, and formed with an outer axial slot. A slider mounted on the outer cylindrical portion has a key portion projecting inwardly into the outer and inner axial slots to prevent relative rotation between the outer and inner cylindrical portions, and allowing rotation of the shift lock lever relative to the key lock lever by moving in the circumferential slot of the inner cylindrical portion. An operating member is arranged to move the slider axially from the outside of the casing.

12 Claims, 7 Drawing Sheets

SHIFT LOCK MECHANISM FOR SHIFT LEVER

BACKGROUND OF THE INVENTION

The present invention relates to. a shift lock mechanism for a shift lever mechanism. The present invention relates especially to a shift lock mechanism for a shift lever mechanism operatively connected with a key lock mechanism for a vehicle.

A shift lever mechanism for a vehicle has a shift lock mechanism for allowing an engine key to be pulled out of a key lock mechanism when the shift lever is in a parking position, and for preventing the shift lever from being shifted away from the parking position when the engine key is not in the key lock mechanism.

In general, the shift lever mechanism has a detent structure for allowing a position change of the shift lever when a rod is moved axially in the shift lever by pressing a button in a knob.

The shift lock mechanisms is arranged to prevent the movement of the shift lever directly, or to prevent the movement of the rod.

The rod mechanism may be of a push rod type or a pull rod type. In the push rod type, the rod is pushed downward by a pressing operation of the knob button. In the pull rod type, the rod is pulled upward by a pressing operation of the knob button.

In the shift lever mechanism of the pull rod type, the pull rod is normally urged downward in a pipe of the shift lever connected with the knob, and the lower end of the pull rod is engaged with a detent groove. By a pressing operation of the knob button, the pull rod is lifted up and the lower end is disengaged from the dent groove.

SUMMARY OF THE INVENTION

The shift lock mechanism is required in the shift lever mechanism of the pull rod type, too. However, a conventional shift lock mechanism for the push rod type is not appropriate for the pull rod type.

Therefore, it is difficult to use a shift lock cancellation mechanism in common for both the pull rod type and the push rod type. Moreover, the conventional construction is complicated and tends to increase the number of required parts. The cancellation mechanism is a mechanism for forcibly canceling the shift lock of the shift lever in the parking position, and thereby allowing a shift away from the parking position.

Therefore, it is an object of the present invention to provide a shift lock mechanism having a cancellation mechanism which is compact and usable for shift lever mechanisms of various types.

According to the present invention, a shift lock mechanism comprises:

- a shift lock lever having an inner cylindrical portion rotatably supported in a casing, the inner cylindrical portion having an inner axial slot and a circumferential slot extending continuously from the axial slot;
- a key lock lever having an outer hollow cylindrical portion fitting over the inner cylindrical portion of the shift lock lever, the outer hollow cylindrical portion having an outer axial slot;
- a slider mounted on the outer cylindrical portion of the key lock lever, the slider having a key portion projecting inwardly into the outer and inner axial slots to prevent relative rotation between the outer and inner cylindrical portions of the shift lock lever and the key lock lever, and allowing rotation of the shift lock lever relative to the key lock lever by moving in the circumferential slot of the inner cylindrical portion; and
- an operating member for moving the slider axially on the outer cylindrical portion of the key lock lever.

BRIEF DESCRIPTION OF THE DRAWINGS

FIGS. 5A and 5B are views showing the main portion of the shift lock mechanism of FIG. 1 in a first state.

FIGS. 6A and 6B are views showing the main portion of the shift lock mechanism of FIG. 1 in a second state.

DETAILED DESCRIPTION OF THE INVENTION

Figure 1:
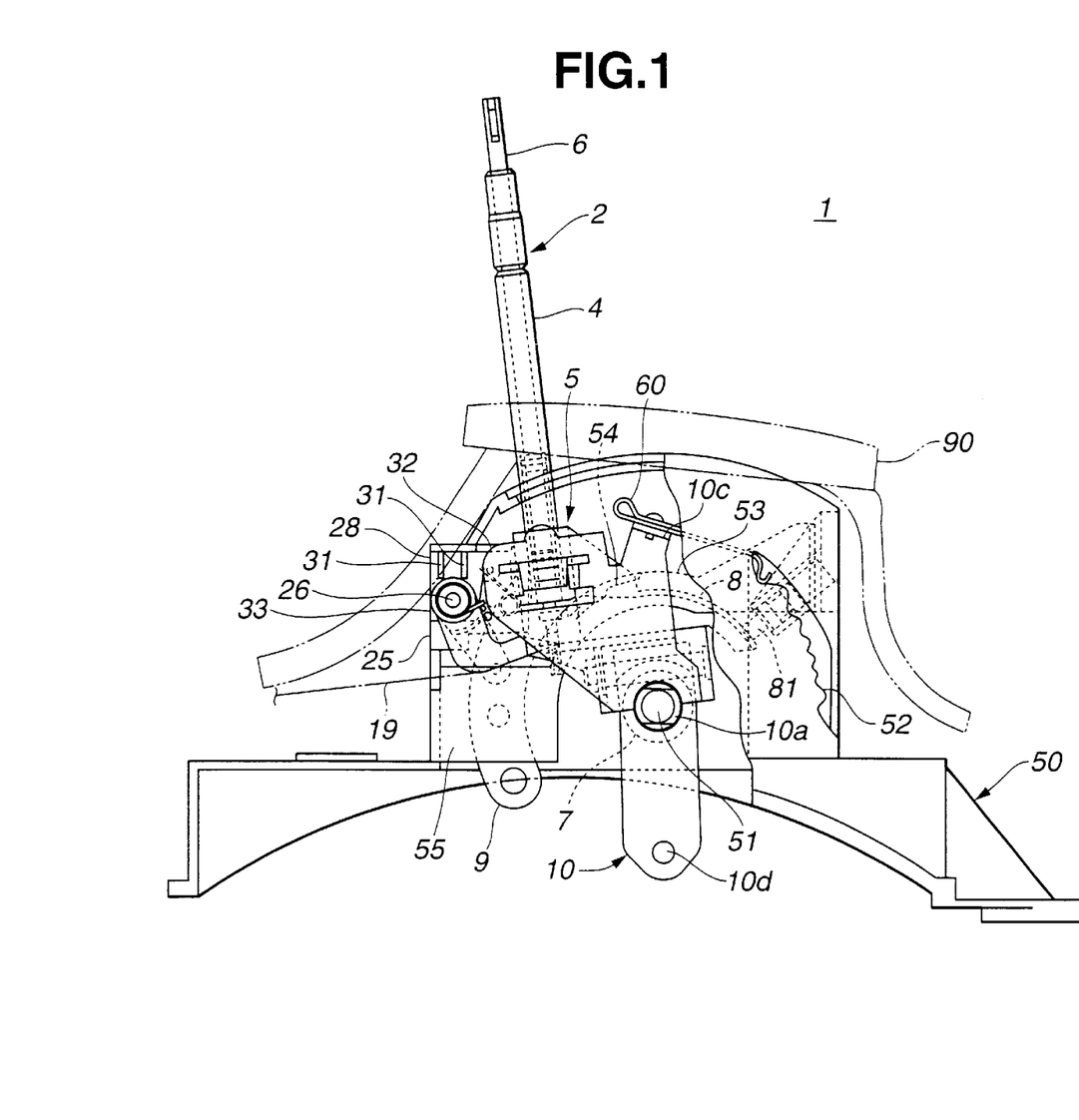
FIG. 1 is a sectional side view of a shift lever mechanism according to one embodiment of the present invention.
Figure 2:
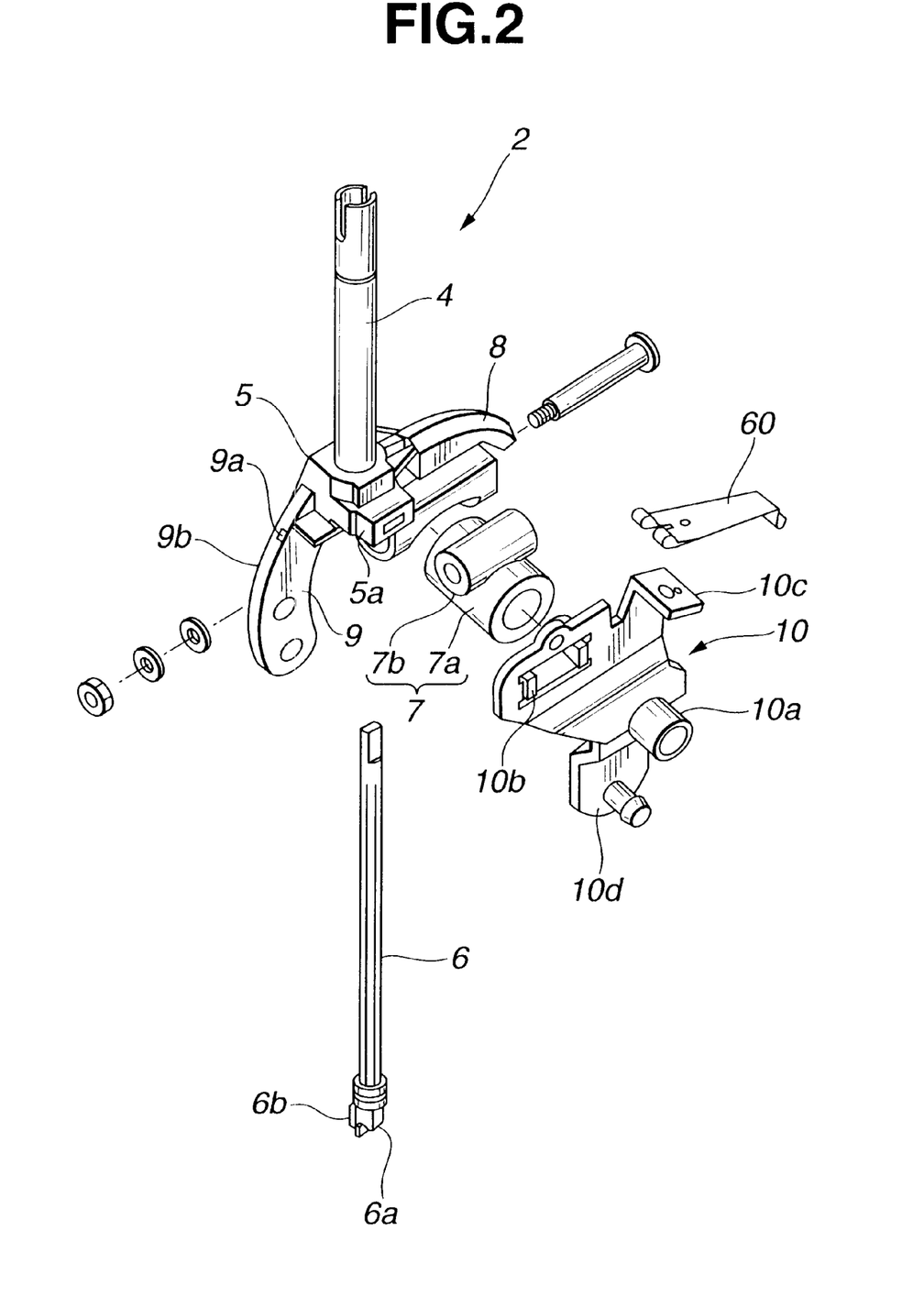
FIG. 2 is an exploded perspective view of a shift lever shown in FIG. 1.

FIGS. 1 and 2 show a shift lever mechanism 1 according to one embodiment of the present invention. A shift lever 2 is rotatably or swingably supported on a casing 50 to be fixed to a vehicle body. The shift lever 2 is rotatable or swingable back and forth along the longitudinal (or front and rear) direction of the vehicle. The shift lever 2 is also rotatable or swingable right and left along the lateral direction of the vehicle. The shift lever 2 has a knob (not shown) on the top, a pipe 4 extending downward from the knob, a pull rod 6 received in the pipe 4, and a rotation base 5 of resin connected to the lower end of the pipe 4. The rotation base 5 is rotatably supported through a support member 7 on a hollow cylinder 10a of a switching lever 10. The support member 7 has a lateral cylindrical portion 7a extending in the lateral direction of the vehicle body and a longitudinal cylindrical portion 7b extending in the longitudinal direction of the vehicle body. The lateral and longitudinal cylindrical portions 7a and 7b are joined together. Thus, the shift lever 2 of this example is swingable right and left along the lateral direction of the vehicle as well as back and forth along the longitudinal direction of the vehicle. The hollow cylinder 10a of the switching lever 10 is supported rotatably back and forth along the longitudinal direction, on the casing 50 through a bolt 51. The switching lever 10 has a mounting portion 10c on the top and a hook portion 10d on the lower side. The mounting portion 10c fixedly supports a plate spring 60 for fitting in a check groove 52 integrally formed in the casing 50 to provide adequate positioning feeling at each shift position during rotation of the switching lever 10. The hook portion 10d of the switching lever 10 fixedly catches one end of a shift cable connected to an automatic transmission of the vehicle.

The rotation base 5 has a tectiform swing guide 8 projecting toward the front of the vehicle and an arched arm 9 projecting toward the rear of the vehicle. The swing guide 8 and the arched arm 9 are both integral parts of the rotation base 5. The tectiform swing guide 8 is shaped like an arc of a circle around the bolt 51 on which the rotation base 5 swings back and forth along the front and the rear direction. The tectiform swing guide 8 is shaped like a roof, and has left and right sloping surfaces. A check pin 81 is installed in the casing 50, and arranged to slide contiguously on the upper surfaces of the tectiform swing guide 8. The check pin 81 is urged in a projecting direction by a spring for providing adequate shift feeling in swinging the shift lever 2 in the right and left directions and for applying a leftward force to the shift lever 2 when shifted on the left side, and a rightward force to the shift lever 2 when shifted on the right side. When the shift lever 2 is swung to the left, a trapezoidal projection 5a provided in the rotation base 5 fits into an engagement hole 10b formed in the upper part of the switching lever 10. Thus, the switching lever 10 rotates as a unit with the shift lever 2, and thereby performs the shift operation in an automatic transmission mode. When the shift lever 2 is swung to the right, the trapezoidal projection 5a disengages from the engagement hole 10b of the switching lever 10, and thereby allows the shift lever 2 to swing independently from the switching lever 10. In this state, the shift lever 2 can be operated in a manual transmission mode with switching devices for detecting a forward shift to a plus side for upshift and a rearward shift to a minus side for downshift.

The arched arm 9 has an arched surface 9b extending in the form of an arc of a circle having a predetermined radius around the (hollow) lateral cylindrical portion 7a of the support member 7 extending in the lateral (left and right) direction of the vehicle body. A recess 9a is formed in the arched surface 9b, at a position close to the base portion of the arched arm 9. In the lower end portion of the pull rod 6, there are formed a step portion 6a and a projection 6b. The step portion 6a is arranged to engage with, and disengage from, a detent groove 54 formed in an upper surface of a detent 53 formed across the middle of the casing 50. The projection 6b is designed to engage with, and disengage from a free end portion of a shift lock lever 12. The detent 53 is placed between the rotation base 5 and the switching lever 10, and shaped like a circular arc around the bolt 51 as the center. The detent groove 54 in the upper surface of the detent 53 is designed to fittingly receive the step portion 6a of the pull rod 6 at each shift position.

A solenoid 55 is attached to the casing 50. The solenoid 55 faces to a side surface of the arched arm 9.

The arched arm 9 is formed with holes 91 and 92 for receiving the tip of a plunger of the solenoid 55. When the shift lever 2 is shifted to the parking range or the neutral range, the hole 91 or 92 is positioned to correctly receive the plunger projected from the solenoid 55 by the action of a detection switch (not shown), to prevent the shift lever 2 from being shifted away therefrom. When a brake pedal is depressed, the plunger retracts, and thereby allows shifting operation of the shift lever 2.

Figure 3:
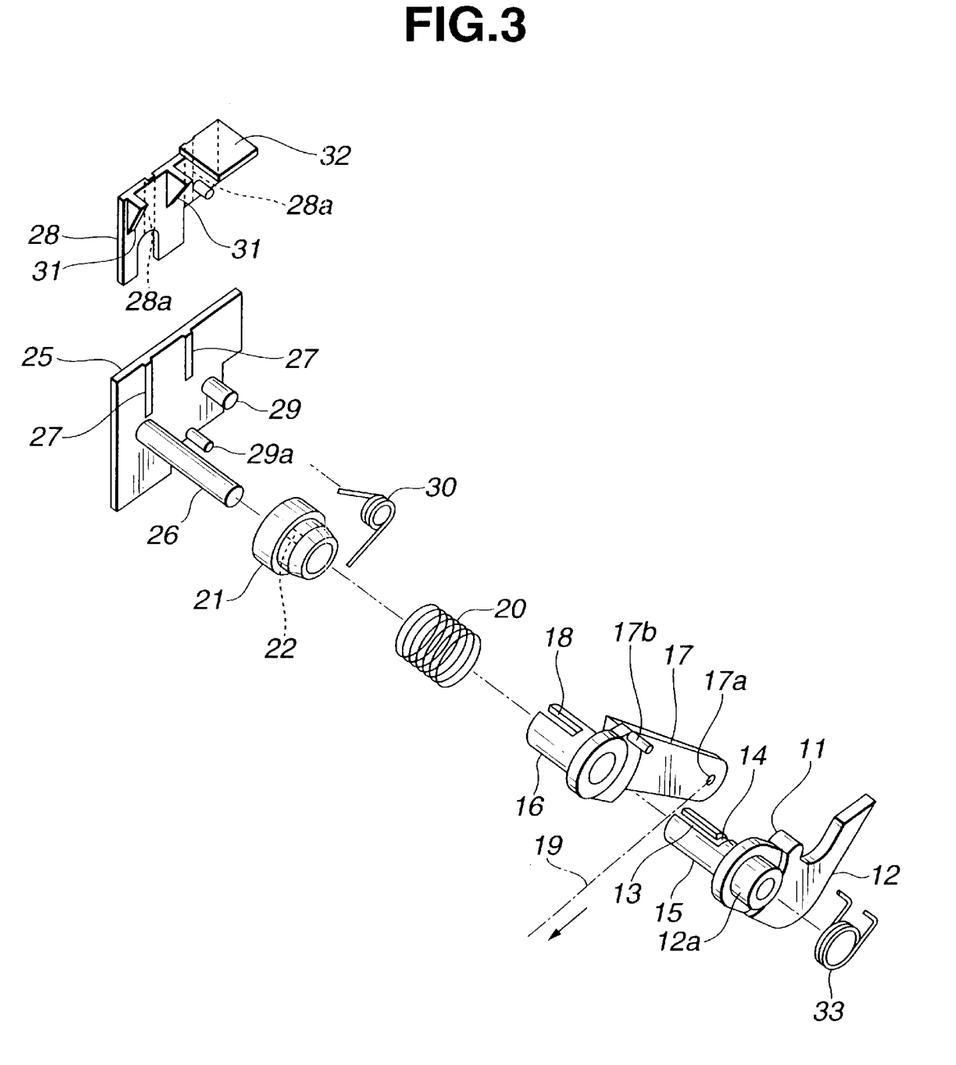
FIG. 3 is an exploded perspective view of a main portion of a shift lock mechanism shown in FIG. 1.

The shift lock lever 12 is rotatable in the region of the rotation of the arched arm 9. As shown in FIG. 3 in detail, the shift lock lever 12 has a (lock) projection 11 for engaging in and disengaging from the (lock) recess 9a.

The shift lock lever 12 is rotatably mounted on a shaft 26 projecting from a bracket 25 fixed to the casing 50. The shaft 26 is substantially parallel to the bolt 51, as shown in FIG. 1. The shift lock lever 12 has an inner hollow cylindrical portion 15 formed with an inner axial slot 13 and a circumferential slot 14 connected continuously in the shape of a letter L. The axial and circumferential slots 13 and 14 of the shift lock lever 12 may be grooves or slits.

A key lock lever 17 shown in FIG. 3 has an outer hollow cylindrical portion 16 coaxially fitting over the inner cylindrical portion 15 of the shift lock lever 12. The inner and outer cylindrical portions 15 and 16 of the shift lock lever 12 and the key lock lever 17 are both mounted on the shaft 26 of the bracket 25. The outer hollow cylindrical portion 16 is formed with an outer axial slot 18 extending axially together with the inner axial slot 13. The key lock lever 17 has an arm formed with a through hole 17a at the arm end. One end of a key lock cable 19 is connected to the through hole 17a. The key lock lever 17 is integrally formed with a projection 17b. A spring 33 is coiled around a hub portion 12a of the shift lock lever 12. The spring 33 has a first end abutting against the projection 17b of the key lock lever 17, and a second end abutting against the shift lock lever 12.

Figure 5A:
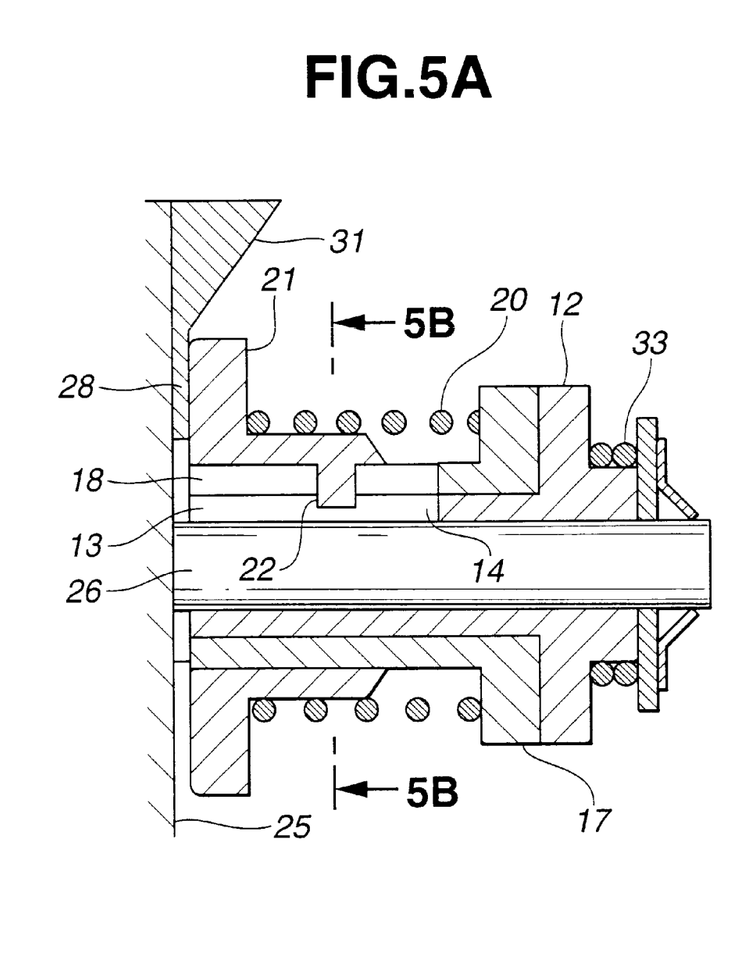
FIG.5A is a sectional view taken across a line 5A—5A shown in FIG.5B.
Figure 5B:
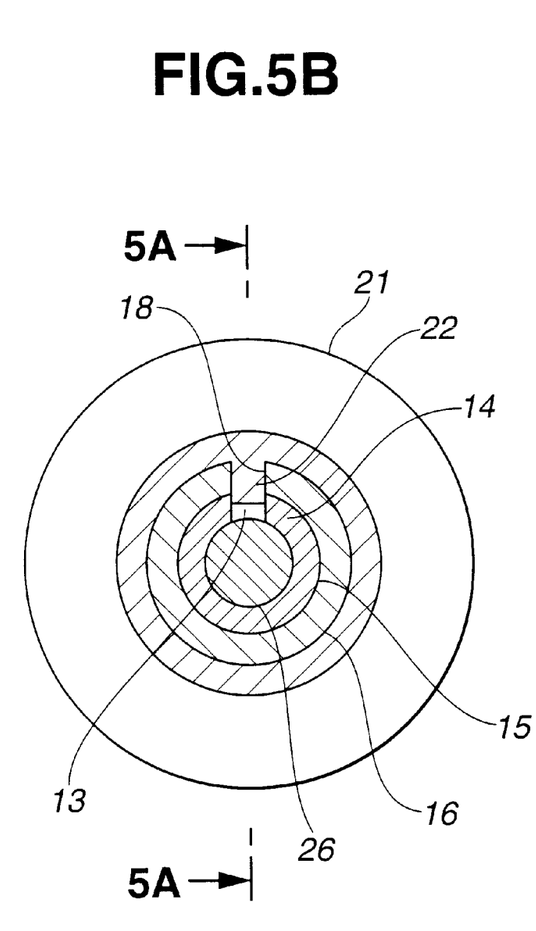
FIG.5B is a sectional view taken across a line 5B—5B shown in FIG.5A.
Figure 6A:
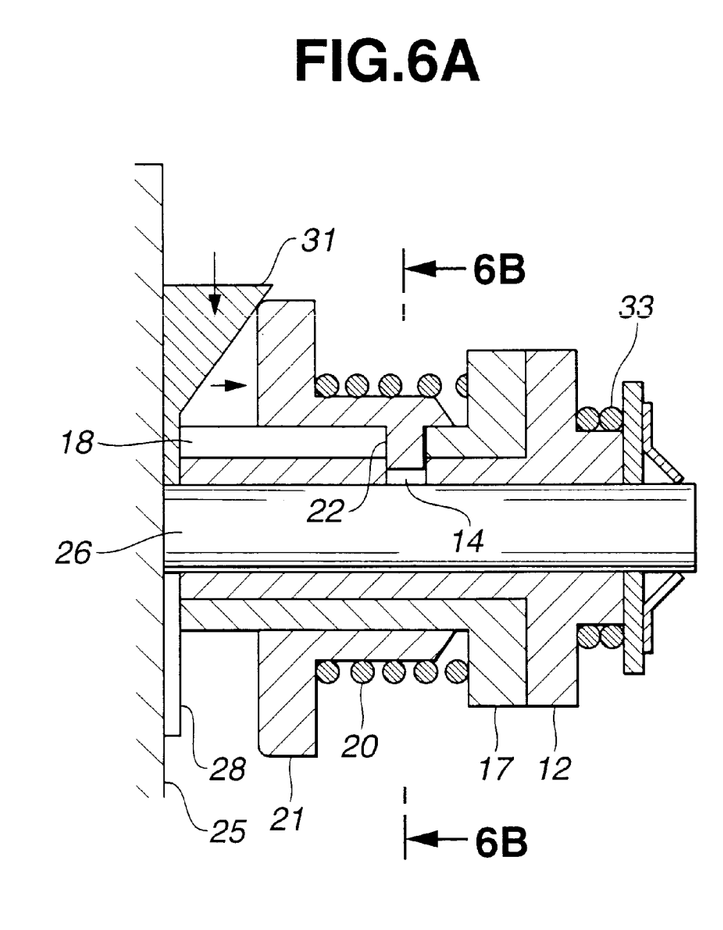
FIG.6A is a sectional view taken across a line 6A—6A shown in FIG.6B.
Figure 6B:
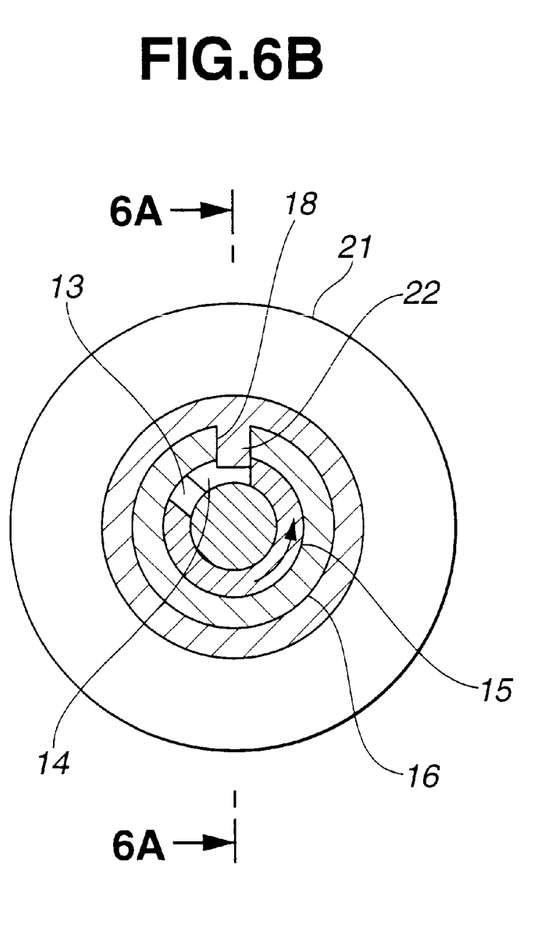
FIG.6B is a sectional view taken across a line 6B—6B shown in FIG.6A.

A coil spring 20 and a slider 21 are mounted on the outer hollow cylindrical portion 16 of the key lock lever 17. The slider 21 is urged by the coil spring 20 axially on the outer hollow cylindrical portion 16. The slider 21 is shaped like a collar, and has an inside circumferential surface formed with a key portion 22 projecting radially inward. This key portion 22 fits in the outer and inner axial slots 13 and 18, as shown in FIGS. 5A and 5B, to prevent relative rotation between the shift lock lever 12 and the key lock lever 17, so that the shift lock lever 12 and the key lock lever 17 rotate as a unit. When the slider 21 is moved axially away from the bracket 25, against the force of the coil spring 20, the key portion 22 moves into the circumferential groove 14, and thereby allows the shift lock lever 12 to rotate alone within a predetermined angular range, as shown in FIGS. 6A and 6B.

The bracket 25 is fixed inside the casing of the shift lever mechanism 1. The bracket 25 has first and second vertical guide rails 27 on the surface facing toward the shift lock lever 12 and the key lock lever 17.

Figures 4A, 4B:
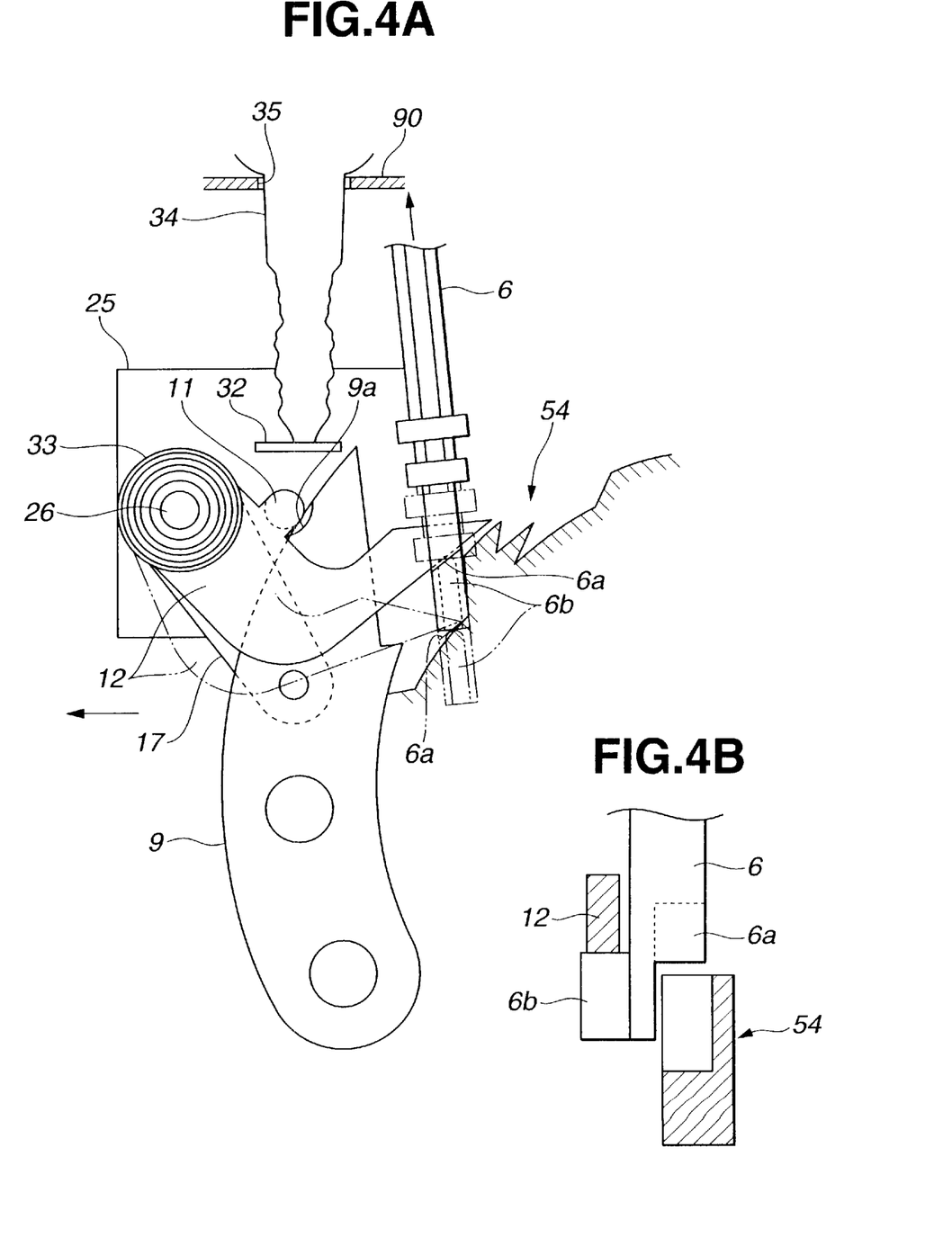
FIGS. 4A and 4B are views for illustrating operations of a cancellation mechanism of the shift lock mechanism shown in FIG. 1.

An operating member (or slide member) 28 is slidable up and down along the vertical guide rails 27 of the bracket 25. The operating member 28 has first and second grooves 28a engaging with the first and second vertical guide rails 27, respectively, in such a manner as to allow the operating member 28 to move up and down. A spring 30 is mounted on a projection rod 29 of the bracket 25. The spring 30 has one end abutting against the operating member 28 and the other end abutting on a projection 29a of the bracket 25, so that the operating member 28 is urged upward. The operating member 28 has first and second slope (pushing) portions 31 to move the slider 21 to the axial direction. The operating member 28 further has an operating portion 32 overhanging in the horizontal direction from the upper end of the operational member 28. The operating portion 32, as shown in FIG. 4, faces upward to an elongate hole 35 through which a special tool or an ignition key 34 can be inserted. The elongate hole 35 is formed in an indicator 90 of the shift lever mechanism 1. The indicator 90 is in the form of a panel extending horizontally over the operating portion 32 of the operational member 28.

In the thus-constructed shift lever mechanism 1, the key lock and the shift lock are achieved in the following manner. When the vehicle is stopped and the shift lever 2 is shifted to the parking position (P range), the shift lock lever 12 rotates together with the key lock lever 17 urged in the clockwise direction by the key lock cable 19 pulled by an unillustrated spring to the direction shown by an arrow in FIG. 3. Therefore, the projection 11 of the shift lock lever 12 slides into the recess 9a, and at the same time, the free end portion of the shift lock lever 12 enters the region above the projection of the pull rod 6. In this state, the lock mechanism allows the ignition key to be pulled out, and the key lock cable 19 is locked by the extraction of the ignition key. As a result, this lock mechanism achieves the key lock and the shift lock by rendering the key lock lever 17 and the shift lock lever 12 unrotatable, and the pull rod 6 immovable upward.

Figure 7:
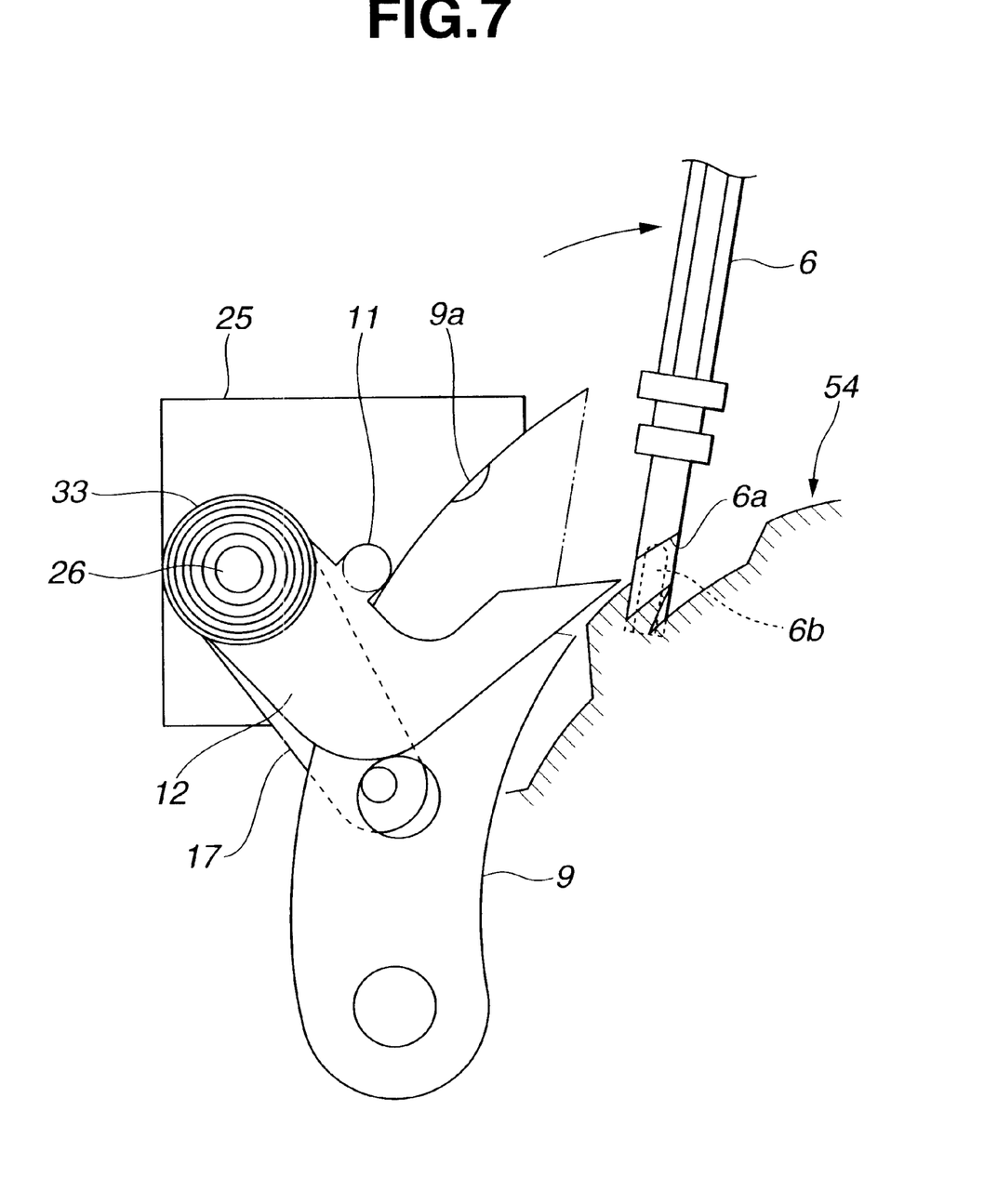
FIG.7 is a view illustrating operations of the shift lock mechanism of FIG. 1.

In case of need, this shift lock mechanism can be forcibly unlocked or cancelled by inserting the special tool or the ignition key through the elongate hole 34 of the indicator 90, and pushing the operating portion 32 of the operational member 28 downward. Therefore, the operational member 28 is pushed downward against the force of the spring 30. During the downward movement, the slope portions 31 push the slider 21, against the force of the coil spring 20, axially on the outer hollow cylindrical portion 16, until the key portion 22 reaches the circumferential slot 14, and the shift lock lever 12 becomes rotatable relative to the key lock lever 17. In this state, the shift lock lever 12 is rotated, within the angular range permitted by the circumferential slot 14, by pulling the pull rod 6 upward against the force of the spring 33, and the projection 11 is disengaged from the recess 9a, as shown in FIG. 7. Thus, this shift lock mechanism releases the shift lever 2 from the position for the P range in the detent groove 54, and thereby allows a shift operation to a desired shift range such as the R or D range.

In this state, the shift lock lever 12 is held in sliding contact with the arched arm 9 by the.spring force of the spring 33. Therefore, the shift lock lever 12 can be returned to the shift lock state by moving the shift lever 2 back to the P range, and thereby allowing the shift lock lever 12 to rotate by the spring force of the spring 33 until the projection 11 and the recess 9a are engaged again.

In a normal operation of inserting and turning the ignition key 34 in the key lock mechanism, the key lock cable 19 slacks and the key lock lever 17 and the shift lock lever 12 rotate together as a unit. Thus, the step portion 6a of the pull rod 6 can be released from the parking position of the detent groove 54 by lifting the free end of the shift lock lever 12 upward with the projection 9b of the pull rod 6.

In the thus-constructed shift lock mechanism according the present invention, the lock cancellation mechanism is provided on the axis on which both the key lock lever 17 and the shift lock lever 12 rotate between the lock position and the unlock position. This arrangement is advantageous for reducing the size and operating space of the cancellation mechanism. Furthermore, the cancellation mechanism of the same type can be used for both the pull rod type and the push rod type.

What is claimed is:

1. A shift lock mechanism comprising:
  a casing;
  a shift lever unit having a base portion pivotally supported on the casing, a rod, and an arched arm formed with a recess;
  a detent member for preventing movement of the shift lever unit by engagement with the rod;
  a shift lock lever having an inner cylindrical portion rotatably supported in the casing, the inner cylindrical portion having an inner axial slot and a circumferential slot extending continuously from the axial slot;
  a key lock lever having an outer hollow cylindrical portion fitting over the inner cylindrical portion of the shift lock lever, the outer hollow cylindrical portion having an outer axial slot;
  a slider mounted on the outer cylindrical portion of the key lock lever, the slider having a key portion projecting inwardly into the outer and inner axial slots to prevent relative rotation between the outer and inner cylindrical portions of the shift lock lever and the key lock lever, and allowing rotation of the shift lock lever relative to the key lock lever by moving in the circumferential slot of the inner cylindrical portion; and
  an operating member for moving the slider axially on the outer cylindrical portion of the key lock lever.

2. The shift lock mechanism as claimed in claim 1, wherein each of the inner and outer axial slots of the inner and outer cylindrical portions of the shift lock lever and the key lock lever extends axially from a first end to a second end along a common axis of the inner and outer cylindrical portions, and the circumferential slot of the inner cylindrical portion of the shift lock lever extends circumferentially around the common axis, continuously from the second end of the axial slot of the inner cylindrical portion of the shift lock lever.

3. The shift lock mechanism as claimed in claim 2, wherein the operating member comprises a pushing portion for pushing the slider in a first axial direction from the first end to the second end of the outer cylindrical portion of the key lock lever when the opearing member is moved along a direction perpendicular to the common axis of the inner and outer cylindrical portions.

4. The shift lock mechanism as claimed in claim 3, wherein the operating member further comprises an operating portion, and the casing comprises a wall having a hole for allowing operation of the operating portion of the operating member from the outside of the casing.

5. The shift lock mechanism as claimed in claim 4, wherein the casing is adapted to be fixed to a vehicle body, the shift lock mechanism further comprises a bracket fixed to the casing, and the bracket comprises a support shaft on which the inner and outer cylindrical portions of the shift lock lever and the key lock lever are mounted, and a guide portion for guiding the operating member to slide up and down.

6. The shift lock mechanism as claimed in claim 5, wherein the wall of the casing is an upper covering wall, the hole of the housing is a slit sized to admit an ignition key of a vehicle, and the operating portion of the operation member is located just below the hole of the upper covering wall of the casing and arranged to be pushed down by the ignition key inserted into the hole of the casing.

7. The shift lock mechanism as claimed in claim 5, wherein the shift lever unit is supported on a base member of the casing so that the shift lever unit is swingable on a swing axis extending along a lateral direction of the vehicle, and the support shaft of the bracket extends along the swing axis of the shift lever unit.

8. The shift lock mechanism as claimed in claim 5, wherein the key lock lever comprises an arm connected with a key lock cable, the shift lever unit further comprises an arched arm having an arc surface extending in the form of an arc of a circle around the swing axis of the shift lever unit, and a lock recess formed in the arc surface, and the shift lock lever comprises a lock projection for engaging with the lock recess of the shift lever unit when the shift lever unit is at a parking position.

9. The shift lock mechanism as claimed in claim 8, wherein the rod of the shift lever unit has a lower rod end for engaging with a detect groove formed in the detent member when the rod is urged in a first longitudinal direction, and an upper rod end for receiving a manual operating to move the rod in a second longitudinal direction, opposite to the first longitudinal direction, to disengage the rod from the detent member, and the shift lock lever comprises an arm for engaging with the lower end of the rod of the shift lever unit when the shift lock lever is swung to a predetermined lock position with the lock projection engaged with the lock recess.

10. The shift lock mechanism as claimed in claim 9, wherein the shift lock mechanism further comprises a spring disposed between the slider and the key lock lever, for urging the slider in a second axial direction opposite to the first axial direction, a spring disposed between the shift lock lever and the key lock lever, for urging the shift lock lever in a predetermined rotational direction with respect to the key lock lever, and a spring disposed between the operating member and the bracket, for urging the operating member upward.

11. The shift lock mechanism as claimed in claim 9, wherein the pushing portion of the operating member has a slant surface for translating a downward movement of the operating member into an axial movement of the slider.

12. A shift lock mechanism comprising:

a bracket comprising a support shaft;

a swingable shift lock lever for shift lock operation, the shift lock lever being mounted on the support shaft, the shift lock lever comprising an inner cylindrical portion rotatably mounted on the support shaft of the bracket, the inner cylindrical portion having an inner axial slot and a circumferential slot extending continuously from the axial slot;

a swingable key lock lever for key lock operation, the key lock lever comprising an outer hollow cylindrical portion fitting over the inner cylindrical portion of the shift lock lever, the outer hollow cylindrical portion having an outer axial slot;

a slider mounted on the outer cylindrical portion of the key lock lever, the slider having a key portion projecting inwardly into the outer and inner axial slots to prevent relative rotation between the outer and inner cylindrical portions of the shift lock lever and the key lock lever, and allowing rotation of the shift lock lever relative to the key lock lever by moving in the circumferential slot of the inner cylindrical portion; and an operating member slidably mounted on the bracket, for moving the slider axially on the outer cylindrical portion of the key lock lever.

* * * * *